United States Patent
Verellen

[19]

[11] Patent Number: 6,123,166
[45] Date of Patent: Sep. 26, 2000

[54] RELEASE APPARATUS FOR A SEAT BELT BUCKLE

[75] Inventor: Lawrence J. Verellen, Washington, Mich.

[73] Assignee: TRW Vehicle Safety Systems Inc., Lyndhurst, Ohio

[21] Appl. No.: 09/141,958

[22] Filed: Aug. 28, 1998

[51] Int. Cl.[7] ............................ B60R 22/32; A44B 11/25
[52] U.S. Cl. ..................... 180/268; 280/801.1; 24/602; 24/603
[58] Field of Search .................. 280/801.1; 180/268, 180/269, 270; 24/602, 603; 60/632

[56] References Cited

U.S. PATENT DOCUMENTS

| | | | |
|---|---|---|---|
| 3,922,762 | 12/1975 | Turner et al. | 24/603 |
| 4,050,122 | 9/1977 | Turner et al. | 24/603 |
| 4,553,625 | 11/1985 | Tsuge et al. | . |
| 4,738,413 | 4/1988 | Spinosa et al. | 280/801.1 |
| 4,920,619 | 5/1990 | Bender et al. | 24/602 |
| 5,165,498 | 11/1992 | Garboli et al. | . |
| 5,568,940 | 10/1996 | Lane, Jr. | 180/268 |
| 5,765,660 | 6/1998 | Ambrosi | 180/268 |

*Primary Examiner*—Lanna Mai
*Assistant Examiner*—Ruth Ilan
*Attorney, Agent, or Firm*—Tarolli, Sundheim, Covell, Tummino & Szabo L.L.P.

[57] ABSTRACT

A buckle release apparatus (42) includes a seat belt buckle (36) which may be mounted in a vehicle. The buckle (36) is operable to receive and retain a buckle tongue (28) within the buckle (36). A sensor (56), which senses a vehicle emergency condition, is electrically connected with a pyrotechnic device (58). The sensor (56) is operable to effect actuation of the pyrotechnic device (58). The pyrotechnic device (58), when actuated, effects operation of the buckle (36) to release the buckle tongue (28) retained within the buckle (36).

4 Claims, 3 Drawing Sheets

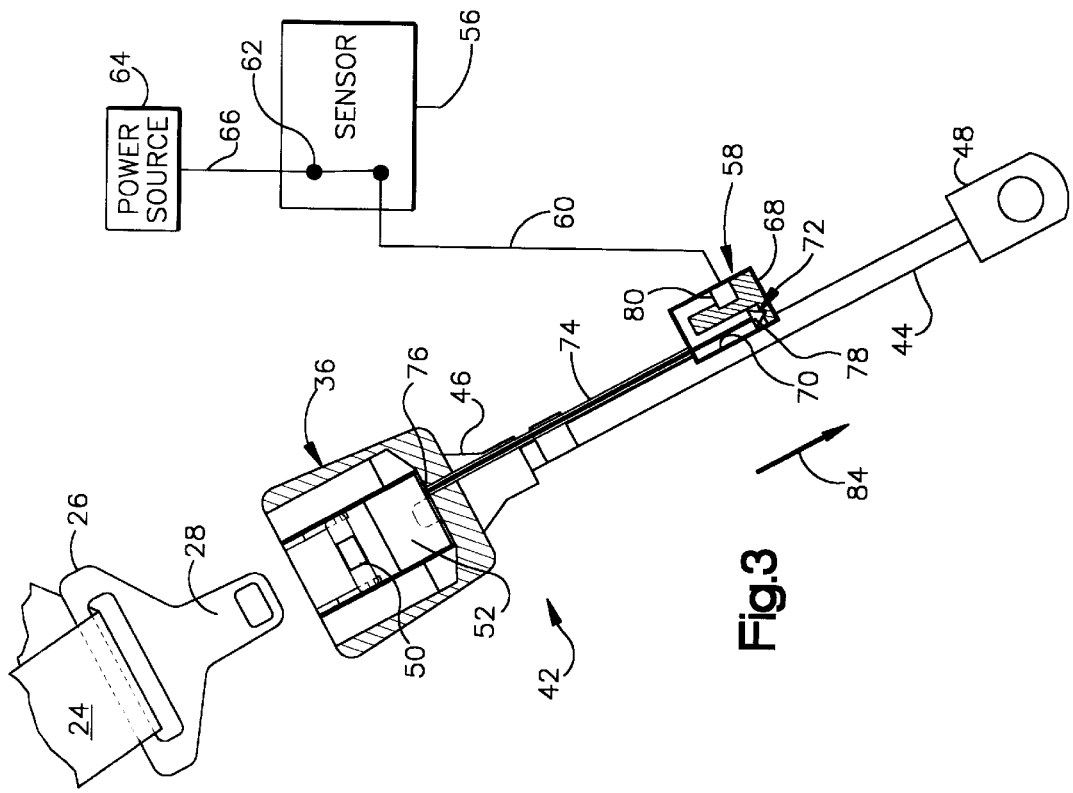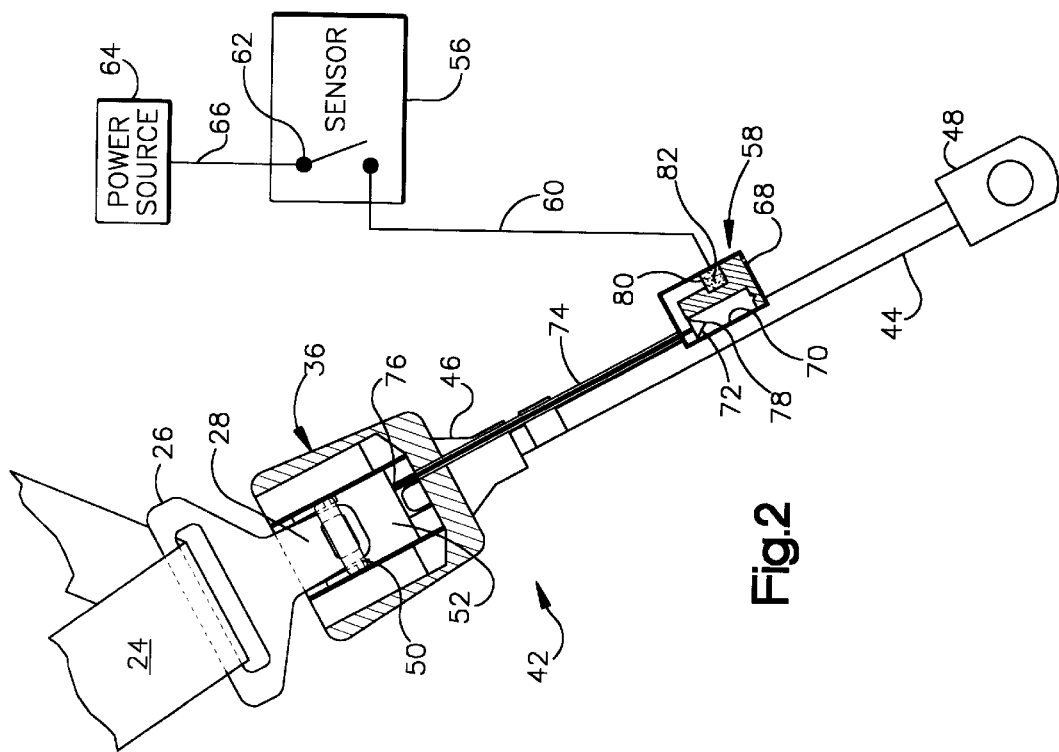

RELEASE APPARATUS FOR A SEAT BELT BUCKLE

TECHNICAL FIELD

The present invention is directed to a vehicle occupant safety apparatus and, more particularly, to an automatic release apparatus for releasing a buckle tongue from a seat belt buckle.

BACKGROUND OF THE INVENTION

A conventional seat belt system includes seat belt webbing which may be positioned around a vehicle occupant by latching a buckle tongue into a seat belt buckle. While maintaining the tongue latched in the buckle generally helps to protect a vehicle occupant during a crash event, it may be desirable to release the tongue automatically from the seat belt buckle under certain conditions.

SUMMARY OF THE INVENTION

The present invention is directed to an apparatus which includes a seat belt buckle which may be mounted in a vehicle. The buckle is operable to receive and retain a buckle tongue within the buckle. A sensor senses a vehicle emergency condition. An actuatable pyrotechnic device is electrically connected with the sensor and operatively connected with the buckle. The sensor is operable to effect actuation of the pyrotechnic device upon sensing a vehicle emergency condition which, in turn, causes the buckle to release a buckle tongue retained within the buckle.

BRIEF DESCRIPTION OF THE DRAWINGS

The foregoing and other features of the invention will become more apparent to one skilled in the art upon consideration of the following description of the invention and the accompanying drawings in which:

FIG. 2 is an enlarged view of part of the apparatus of FIG. 1, illustrating a first condition of the apparatus;

FIG. 3 is another enlarged view of part of the apparatus of FIG. 1, illustrating a second condition of the apparatus.

DESCRIPTION OF A PREFERRED EMBODIMENT

Figure 1:
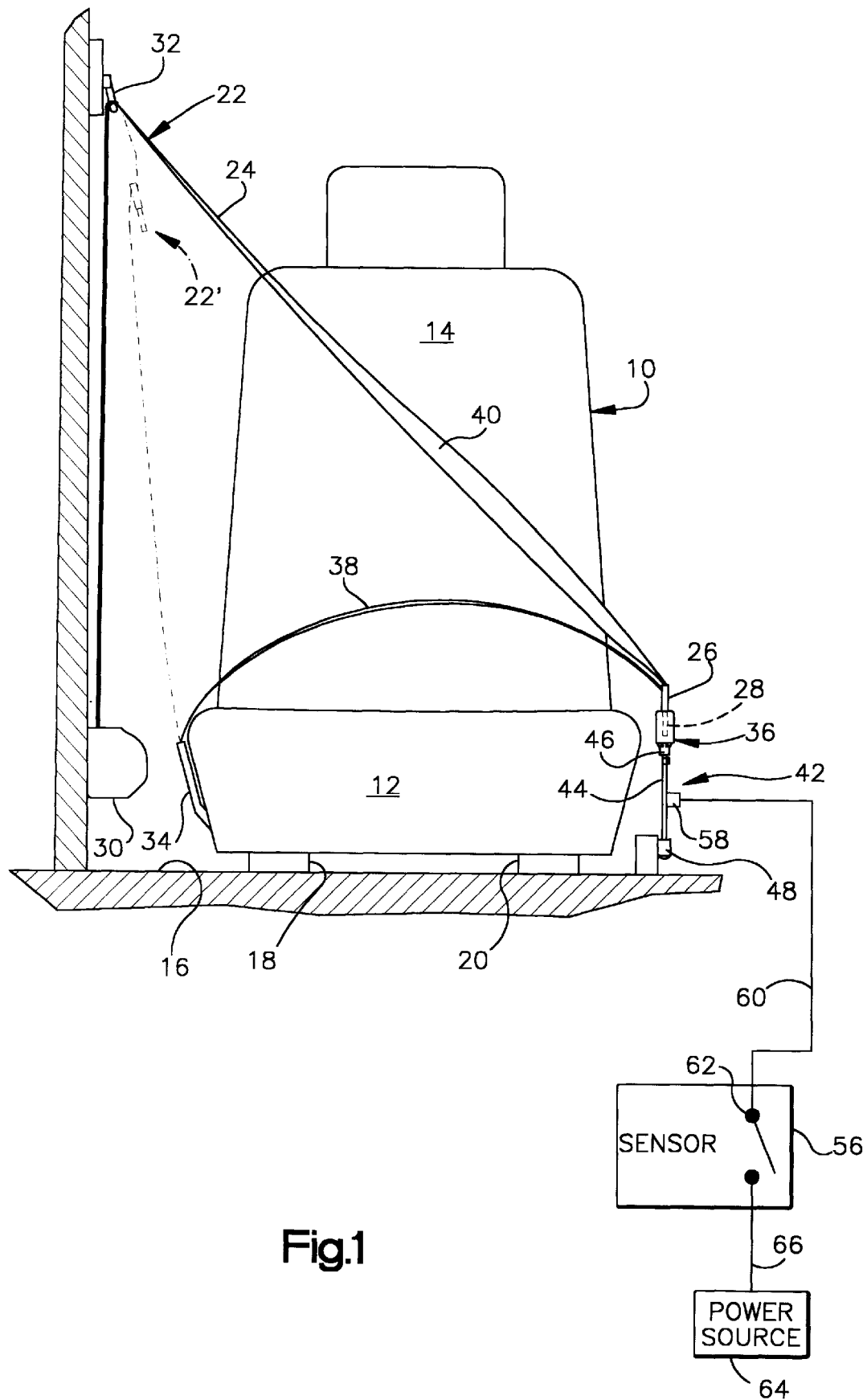
FIG. 1 is a front view of a vehicle seat in combination with a preferred embodiment of an apparatus in accordance with the present invention.

FIG. 1 illustrates a vehicle seat 10 having a seat cushion 12 and a seat back 14 extending upwardly from the seat cushion 12. The seat 10 is mounted to a lower portion of a vehicle body portion 16 by suitable support members 18 and 20.

A seat belt restraint system 22 is operatively associated with the vehicle seat 10. The particular seat belt system 22 illustrated in FIG. 1 is a three-point active seat belt system, although other seat belt system configurations may be used. For example, the seat belt system 22 could be a passive seat belt system and/or a two-point seat belt system.

The seat belt system 22 includes a length of seat belt webbing 24 and a buckle tongue assembly 26 attached to the webbing 24. The buckle tongue assembly includes a rigid buckle tongue 28. The webbing 24 is attached to a seat belt retractor 30 located adjacent one side of the seat 10 proximate the lower vehicle body portion 16. The retractor 30 includes a spool (not shown) which rotates to wind a portion of the length of webbing 24 around the spool. The webbing 24 extends upwardly from the retractor 30 to a D-ring 32, through which the webbing 24 extends. The seat belt webbing 24 also is attached adjacent the lower portion of the vehicle body 16 to an anchor 34. The anchor 34 may be attached to the vehicle floor 16 or to the seat 10 adjacent the same side of the seat 10 where the retractor 30 is located.

FIG. 1 illustrates the seat belt system 22 in its belted condition as solid lines, with the buckle tongue 28 received within a seat belt buckle 36. An unbelted condition for the seat belt system is illustrated in dashed lines at 22'. When in the belted condition, the buckle tongue assembly 26 is adjustable along the length of webbing 24 to divide the webbing into lap and chest portions 38 and 40, respectively.

The buckle 36 is located adjacent the side of the seat 10 opposite the anchor 34 and the retractor 30. A support member, such as an elongated shaft 44, has a first end 46 connected with the buckle 36. The shaft 44 extends from a lower portion of the buckle 36 and terminates in a second end portion 48 spaced from the buckle. The second end portion 48 is configured for attachment with the vehicle, suitably to a side of the vehicle seat 10 or to the lower vehicle body portion 16. Alternatively, the second end portion 48 may be attached to a suitable seat belt pretensioner device.

Referring to FIGS. 1, 2 and 3, the buckle 36 is operable to receive and retain the buckle tongue 28 within the buckle 36 until the buckle tongue is released. The buckle 36 includes a latch mechanism 50 which is operable to retain the buckle tongue 28 within the buckle 36. The latch 50 is movable between a first position which corresponds to a latched condition, as shown in FIG. 2, and a second position which corresponds to a release condition, as shown in FIG. 3. The latch 50 is movable between the first and second positions via a pushbutton 52 operatively connected with the latch 50.

The latch mechanism 50 also may be moved automatically from its first position to its second position upon actuation of a release apparatus 42. The release apparatus 42 includes a sensor 56. The sensor 56 senses a vehicle emergency condition, such as, for example, a fire within the vehicle or an intrusion of a substantial amount of water into the vehicle. The sensor 56 is electrically connected to an actuatable pyrotechnic device 58 through an electrical connection 60. The sensor 56 preferably includes a switch 62 which is operable to connect the pyrotechnic device 58 with a suitable source of electrical power 64 through an electrical connection 66. The power source 64 may be a vehicle battery or a separate power circuit configured to provide a predetermined amount of electric current to the pyrotechnic device 58. Thus, upon sensing a predetermined vehicle emergency condition, the sensor 56 closes the switch 62 to connect the pyrotechnic device 58 electrically with the power source 64.

Alternatively, the sensor switch 62 may be located external to the sensor 56, such as adjacent to the pyrotechnic device 58. In this alternative configuration, upon the sensor 56 sensing a vehicle emergency condition, the sensor 56 provides an activation signal to the external switch to connect the pyrotechnic device 58 electrically with the power source 64. In addition, while a single wire connection is illustrated for connections 60 and 66, it will be understood and appreciated that a ground connection, suitably to the vehicle chassis or a negative terminal of the power source 64, typically will be provided. It further will be apparent to those skilled in the art that other configurations of sensor assemblies and power supply circuits also may be used without departing from the present invention.

When the pyrotechnic device 58 is actuated, it effects movement of the latch 50 from its first position (FIG. 2) to its second position (FIG. 3). The pyrotechnic device 58 preferably includes a rigid housing 68 having an elongated cylindrical passage 70 extending generally parallel to the shaft 44. A piston 72 is disposed within the passage 70 and is operable to move within the passage upon actuation of the pyrotechnic device 58.

The piston 72 is operatively connected with the latch mechanism 50. Preferably, a connecting element 74, such as a cord or a wire cable, extends between the piston 72 of the pyrotechnic device 58 and the latch mechanism 50. The connecting element 74 has a first end 76 connected with the push-button 52 of the latch mechanism 50 and a second end 78 connected with the piston 72. The piston 72 preferably includes a central longitudinal aperture (not shown) through which the connecting element 74 extends. The connecting element 74 is appropriately tensioned, such that, upon actuation of the pyrotechnic device 58, the piston 72 pulls the connecting element 74 towards the second end 48 of the shaft 44. This effects movement of the latch mechanism 50 from its first position to its second position to release the buckle tongue 28 from the buckle 36, as shown in FIG. 3.

The pyrotechnic device 58 includes a conventional initiator 80 which includes a known ignitable material 82. When the pyrotechnic device 58 is electrically coupled with the power source 64, current from the power source actuates the initiator 80 and ignites the ignitable material 82. The ignitable material 82 provides a flow of fluid into the passage 70. The fluid flow rapidly urges the piston 72 toward the second end 48 of the shaft 44 in the direction of arrow 84. Movement of the piston 72 in the direction of arrow 84 causes the latch mechanism 50 to move from its latched position (FIG. 2) to its release position (FIG. 3), thereby effecting release of the buckle tongue 28 from the buckle 36.

Figure 4:
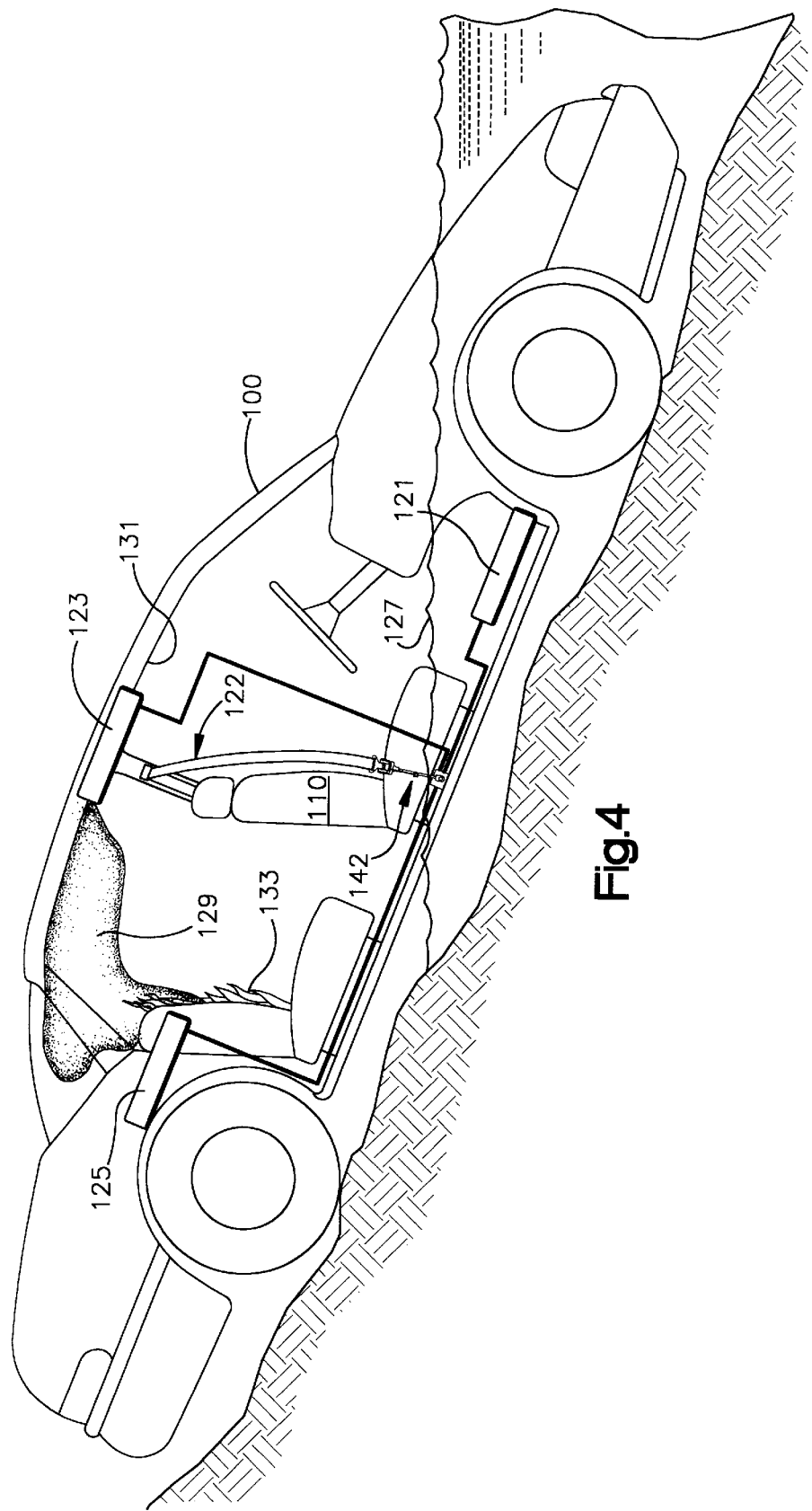
FIG. 4 is a side elevation of a vehicle, with parts omitted, illustrating certain operating conditions of an apparatus in accordance with the present invention.

FIG. 4 diagrammatically illustrates a vehicle 100 in two emergency conditions in which it may be desirable to release a vehicle seat belt assembly 122 automatically. Similar reference characters, increased by adding 100, refer to corresponding components shown in FIGS. 1–3. The two emergency conditions illustrated in FIG. 4 are a vehicle fire condition and a vehicle flooding condition. In order to detect these conditions, the buckle release apparatus 142 preferably includes a plurality of sensors 121, 123 and 125. While three sensors are illustrated, it will be apparent that any number of sensors may be used and that redundant sensors are typically used to verify the existence of an emergency condition.

For example, the sensor 121 may be a moisture responsive sensor device operable to detect substantial amounts of fluid 127, such as water, within the vehicle 100 indicative of a vehicle flooding condition. The sensor 121 may include a plurality of sensors of known configuration capable of detecting the intrusion of a predetermined amount of water into the vehicle 100. The sensor 121 should be resistant to fluid levels within the vehicle 100 resulting from accidental beverage spills and other non-threatening accumulations of fluid within the vehicle. The sensor 121 preferably activates the buckle release apparatus 142 when the vehicle 100 is at least partially submerged in fluid 127, such as illustrated in FIG. 4.

The sensor 123 is illustrated as a smoke detector operable to detect smoke 129 within the vehicle 100 indicative of a vehicle fire condition. The sensor 123 may be any known smoke detection device. It will be apparent to those skilled in the art that the sensor 123 should not be sensitive to cigarette or cigar smoke. As illustrated, the smoke sensor 123 suitably is located at the roof 131 of the vehicle occupant compartment. The sensor 123 activates the vehicle release apparatus 142 upon detecting the vehicle fire condition resulting from an accumulation of smoke within the vehicle.

The sensor 125 is operable to detect a predetermined amount of heat, which is indicative of a fire condition, within the vehicle 100. The sensor 125 may be any conventional temperature sensor calibrated to detect heat due to a vehicle fire 133. The sensor 125 may be located toward the rear of the vehicle 100, such as near the vehicle fuel tank. Alternatively, the sensor 125 may be located near or within the vehicle engine compartment. It will be understood and appreciated that the temperature-sensitive sensor 125 should not activate the release device 142 upon exposure of the vehicle 100 to the sun. The sensor 125 activates the buckle release apparatus upon detecting heat due to a vehicle fire condition, such as shown in FIG. 4.

Suitable control electronics also may be implemented to require that both the heat sensor 125 and the smoke sensor 123 be triggered to determine that a fire condition exists. Upon sensing smoke 129 and heat due to a fire 133, the release apparatus 142 may then be actuated.

In view of the foregoing, it should be appreciated that the buckle release apparatus 42 or 142 will facilitate rescue and/or escape of a belted vehicle occupant during vehicle emergency conditions, such as described above. Other types of vehicle emergency conditions also may be monitored to effect actuation of the release apparatus of the present invention. It will also be understood that additional sensors may be located throughout the vehicle to ensure that a vehicle emergency condition exists prior to actuating the release mechanism of the present invention.

From the above description of the invention, those skilled in the art will perceive improvements, changes and modifications. Such improvements, changes and modifications within the skill of the art are intended to be covered by the appended claims.

Having described the invention, the following is claimed:

1. An apparatus comprising:
   a seat belt buckle being mounted to a vehicle by an elongated shaft, the seat belt buckle having a latch mechanism for receiving and retaining a buckle tongue, the latch mechanism having a latched condition wherein the buckle tongue is retained in the seat belt buckle and a released condition wherein the buckle tongue is released from the seat belt buckle;
   an actuatable pyrotechnic device being mounted on the elongated shaft between the seat belt buckle and the vehicle, the pyrotechnic device having an elongated passage, a piston, and an ignitable material;
   the elongated passage of the pyrotechnic device extending parallel to the elongated shaft and having a first end and a second end, the first end of the elongated passage being nearer the seat belt buckle than the second end;
   the piston being located in the first end of the elongated passage and moving to the second end of the elongated passage when the ignitable material of the pyrotechnic device is ignited upon actuation of the pyrotechnic device;
   a single connecting element extending from the piston to the latch mechanism and connecting at a single point of contact to both the piston and the latch mechanism, the connecting element being a cord that extends parallel to the elongated shaft and linearly from the elongated passage of the pyrotechnic device to the latch mechanism, movement of the piston to the second end of the elongated passage causing a portion of the cord to enter into the elongated passage and causing the latch mechanism to move from the latched condition to the released condition to release the buckle tongue from the seat belt buckle; and a sensor for sensing a vehicle emergency condition, the sensor being electrically connected to the pyrotechnic device and actuating the pyrotechnic device upon sensing the vehicle emergency condition.

2. The apparatus of claim 1 further being defined by:

the sensor being operable to detect a predetermined amount of heat indicative of a vehicle fire condition.

3. The apparatus of claim 1 further being defined by:

the sensor being operable to detect smoke within a vehicle indicative of a vehicle fire condition.

4. The apparatus of claim 1 further being defined by:

the sensor being operable to detect a predetermined amount of fluid indicative of a vehicle that is at least partially submerged in the fluid.

* * * * *